(12) United States Patent  
Wilson

(10) Patent No.: US 7,017,032 B2  
(45) Date of Patent: Mar. 21, 2006

(54) SETTING EXECUTION CONDITIONS

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 336 days.

(21) Appl. No.: 10/162,071

(22) Filed: Jun. 5, 2002

(65) Prior Publication Data

US 2002/0199086 A1    Dec. 26, 2002

Related U.S. Application Data

(60) Provisional application No. 60/296,747, filed on Jun. 11, 2001.

(51) Int. Cl.  
*G06F 9/38* (2006.01)

(52) U.S. Cl. ......................................... 712/226; 712/22

(58) Field of Classification Search ................ 712/226, 712/236, 239, 247, 248, 22  
See application file for complete search history.

(56) References Cited

U.S. PATENT DOCUMENTS

| | | | | |
|---|---|---|---|---|
| 5,056,015 A | * | 10/1991 | Baldwin et al. | 703/27 |
| 5,542,084 A | * | 7/1996 | Lowe, Jr. | 345/501 |
| 5,555,428 A | * | 9/1996 | Radigan et al. | 712/22 |
| 5,568,631 A | * | 10/1996 | Webb | 712/248 |
| 5,996,070 A | * | 11/1999 | Yamada et al. | 712/236 |
| 6,282,628 B1 | * | 8/2001 | Dubey et al. | 712/22 |
| 6,336,178 B1 | * | 1/2002 | Favor | 712/23 |
| 6,338,137 B1 | * | 1/2002 | Shiell et al. | 712/225 |
| 6,675,291 B1 | * | 1/2004 | Benayoun et al. | 712/236 |
| 6,757,819 B1 | * | 6/2004 | Hoyle et al. | 712/300 |

FOREIGN PATENT DOCUMENTS

| | | |
|---|---|---|
| EP | 0 627 681 | 12/1994 |
| WO | WO 01/06353 A1 | 1/2001 |

OTHER PUBLICATIONS

Lee, Ruby B., "Subword Parallelism With MAX-2" *IEEE Inc.*, vol. 16, No. 4, 1996.  
International Search Report issued Mar. 19, 2003 for Appl. No. EP 02 25 4002, 3 pages.

* cited by examiner

*Primary Examiner*—Eric Coleman  
(74) *Attorney, Agent, or Firm*—Sterne, Kessler, Goldstein & Fox PLLC

(57) ABSTRACT

A method for setting indicators in a control store of a computer system for conditionally performing operations, comprises providing a control store setting instruction defining an execution condition and specifying a control store to be set according to the condition, specifying in the instruction an operand lane size over which a setting operation is to be performed, the operand lane size specified being selected from a plurality of predetermined operand lane sizes, performing the setting operation defined in the setting instruction on a per operand lane basis over a plurality of operand lanes, writing the result of the setting operation to the control store specified in the instruction to set a plurality of indicators on a lane by lane basis, wherein one or a predetermined plurality of indicators is set for each operand lane in dependence on the size of the operand lane defined in the instruction. An instruction for performing the preferred method is also disclosed.

24 Claims, 12 Drawing Sheets

| X side | | | Y side | | |
|---|---|---|---|---|---|
| 63.62 | 61..47 | 46..32 | 31.30 | 29..0 | 20a |
| 0..2 | op30 | | 0..2 | op30 | 20b |
| 0..2 | op30 with imm8 | | 1 | op30 imm extn | 20c |
| 0..2 | op30 excl ld/st | | 3 | LDL1/2. STL1/2 | 20d |
| 3 | | | 0..3 | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 0 | | OPCODE | | | | | | | | Gsrc2 | | | | | | Gsrc1 | | | | | | Gdest | | | | | | Psrc | | | |

22a

| 1 | | OPCODE | | | | | | | | | | | | | Imm8 | | | | | | | Gdest | | | | | | Psrc | | | |

22b

| 1 | | OPCODE | | | | | | | ImmExtn24 | | | | | | | | | | | | | | | | | | | | | | |

22c

| 0 | | OPCODE | | | | | wb | w1 | scale | | Gsrc2(index) | | | | | Gdata | | | | | | Gbase | | | | | | Psrc | | | |

22d

| 2 | | OPCODE | | | | | am | wb | | | | | | Imm9 | | | | | | | Gdata | | | | | | Gbase | | | Psrc | | | |

22e

| 3 | ps2 | ls2 | ld | - | | am | wb | | | | | | | Imm9 | | | | | | | | Gdata | | | | | | Gbase | | | Psrc | | | |

22f

| 0 | | OPCODE | | | | | | hint | | | | | | Gsrc | | | | | | | | Gdest(link) | | | - | | Pbit | | Psrc | | |

22g

| 2 | | OPCODE | | | | | | hint | | | | | | Imm9 | | | | | | | | Gdest(link) | | | - | | Pbit | | Psrc | | |

SETTING EXECUTION CONDITIONS

CROSS-REFERENCE TO RELATED APPLICATIONS

This application claims priority to Provisional U.S. Patent Application No. 60/296,747, filed Jun. 11, 2001.

BACKGROUND OF THE INVENTION

Field of the Invention

The present invention relates to a computer system for conditionally carrying out an operation defined in a computer instruction, and particularly to methods and means for setting execution conditions.

Computer systems are known which act on so-called packed operands. That is, each operand comprises a plurality of packed objects held in respective lanes of the operand. The degree of packing can vary and for 64 bit operands it is known to provide 8 bit packed objects (eight objects per 64 bit operand), 16 bit packed objects (four objects per 64 bit operand) and 32 bit packed objects (two objects per 64 bit operand). A known computer system can conditionally execute instructions on a per operand lane basis according to respective condition codes held in a condition code register. The computer system also includes a test register holding a test code. The test register is addressed by the instruction to compare the test code with the condition codes and thereby conditionally execute the instruction on operand lanes for which the test condition applies. A problem with this type of known system is the need to manage the contents of the test register by means of additional operations to control which lanes are executed.

The present invention seeks to provide an improved method and apparatus for conditionally executing instructions.

SUMMARY OF THE INVENTION

According to one aspect of the present invention there is provided a method for setting indicators in a control store of a computer system for conditionally performing operations, comprising: providing a control store setting instruction defining an execution condition and specifying a control store to be set according to the condition, specifying in the instruction an operand lane size over which a setting operation is to be performed, the operand lane size specified being selected from a plurality of predetermined operand lane sizes; performing the setting operation defined in the setting instruction on a per operand lane basis over a plurality of operand lanes; writing the result of the setting operation to the control store specified in the instruction to set a plurality of indicators on a lane by lane basis, wherein one or a predetermined plurality of indicators is set for each operand lane in dependence on the size of the operand lane defined in the instruction.

According to another aspect of the present invention there is provided an instruction for setting indicators in a control store of a computer system for conditionally performing operations, the computer system comprising a plurality of control stores each containing a plurality of indicators for controlling per lane execution of operations, the instruction comprising: at least one operand field specifying an operand store; an opcode comprising a type field indicating the type of operation to be used in a control store setting operation, and specifying the operand lane size over which the setting operation is to be performed; and at least one destination field designating one of a plurality of control stores comprising indicators to be set by the setting operation according to the setting instruction on a lane by lane basis, wherein during execution one or a predetermined plurality of indicators is set in the designated control store for each operand lane in dependence on the size of operand lane specified in the opcode.

According to another aspect of the present invention there is provided a computer program for performing preferred methods.

In this embodiment, flags in each of a plurality of predicate registers are TRUE or FALSE flags and there is one corresponding to each byte lane. If a lane is predicated TRUE, then the result of the conditional operation will be written into that byte lane of the destination register. If a lane is predicated FALSE then the result of the conditional operation is not written to that byte lane of the destination register.

According to another aspect of the present invention there is provided a computer system for performing operations on a variety of lane sizes, wherein a mechanism for conditional execution is provided for the smallest lane size, together with a mechanism for setting conditional execution flags individually or in predetermined numbers as may be required.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

For a better understanding of the present invention and as to how the same may be carried into effect, reference will now be made by way of example to the accompanying drawings in which:

FIG. 6B illustrates a number of 32 bit instruction formats suitable for inclusion in a 64 bit instruction;

FIG. 8A schematically illustrates a first example of a predicate register setting operation;

FIG. 8B schematically illustrates a second example of a predicate register setting operation;

DETAILED DESCRIPTION OF THE PREFERRED EMBODIMENTS

Reference now is made in detail to the presently preferred embodiments of the invention, examples of which are illustrated in the accompanying drawings and discussed below.

Figure 1:
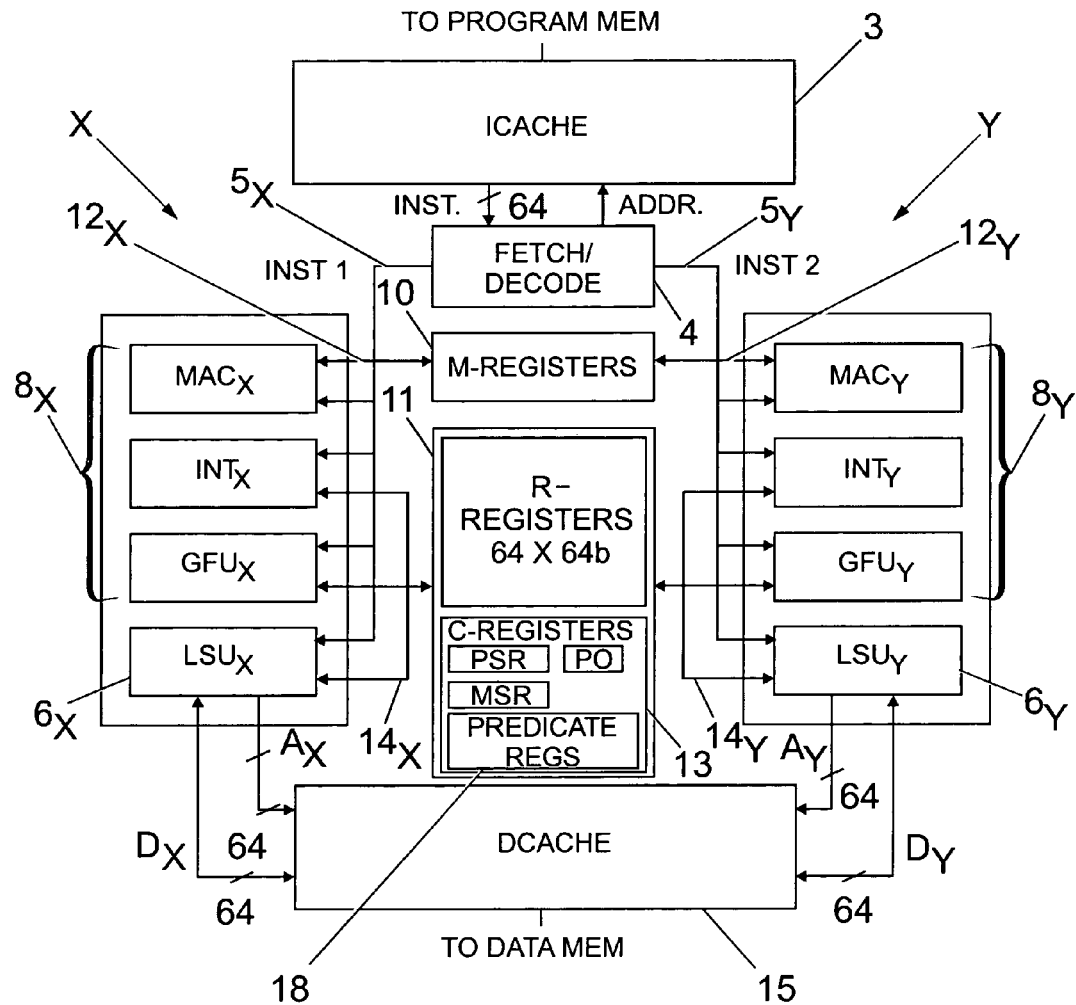
FIG. 1 is a schematic block diagram illustrating a computer system embodying the present invention.

FIG. 1 illustrates a computer system embodying the present invention. The computer system is a 64 bit long instruction word machine including two identical Single Instruction Multiple Data (SIMD) units designated by reference numerals X and Y.

The computer system includes an instruction cache 3 for receiving and holding instructions from a program memory (not shown). The instruction cache 3 is connected to instruction fetch/decode circuitry 4. The fetch/decode circuitry 4 issues addresses in the program memory from which instructions are to be fetched and receives on each fetch operation a 64 bit instruction from the cache 3 (or program memory).

The computer system has two SIMD execution units 8x, 8y, one on the x-side of the machine and one on the y-side. Each of the SIMD execution units 8x, 8y includes three data processing units, namely: a Multiplier Accumulator Unit MAC, an Integer Unit INT and a Galois Field Unit GFU. A Load/Store Unit LSU 6x, 6y is provided on each of the X and Y-side SIMD units. The computer system includes a dual port data cache 15 connected to both the X and Y-side SIMD units and a data memory (not shown). The fetch decode circuitry 4 evaluates the opcode and transmits control signals along the channels 5x, 5y to control the movement of data between designated registers and the MAC, INT, GFU and LSU functional units.

The computer system includes four M-registers 10 for holding multiply-accumulate results and sixty-four general purpose registers 11 including R-registers, each of which is 64 bits wide and "programmer visible". The M-registers are wider than the R-registers, the additional precision being used to accommodate the results of multiply accumulate operations. The computer system has a plurality of control registers 13

The control registers 13 include a Processor State Register PSR, a Machine State Register MSR, a Program Counter PC register and eight predicate registers 18. Processor status information is stored in the PSR and the MSR sticky bits. Rounding and saturation modes and multiply-accumulate pipe control information is stored in the MSR. The predicate registers 18 provide a means for conditionally carrying out operations on a per SIMD lane basis. The processor also has a further set of DIR registers (not shown) which allow interrupt status and timers to be managed.

Figure 2:
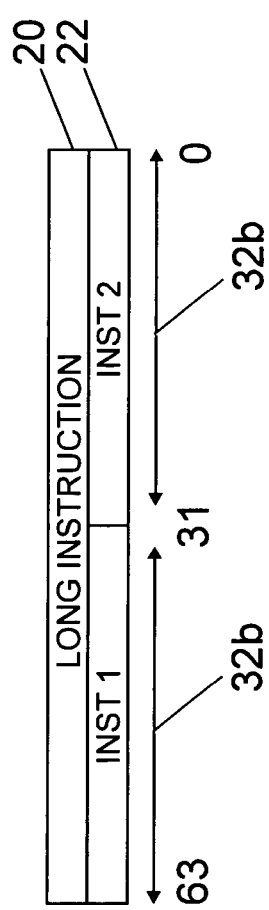
FIG. 2 is a diagram illustrating general formats for encoding instructions processed by the computer system of FIG. 1.

With reference to FIG. 2, each 64 bit instruction is a long instruction word. The long instruction word may define a single operation according to a long instruction format 20 or two independent operations (Inst 1, Inst 2) according to a shorter 32 bit instruction format 22. Examples of long and short instruction formats are provided later with reference to FIGS. 6A and 6B. Each of the X and Y sides of the machine are thus capable of 64 bit execution on multiple data units, for example on four 16 bit packed operands at once under the control of the relevant 32 bit instruction.

Each of the MAC, INT, GFU and LSU operate on a Single Instruction Multiple Data (SIMD) principle according to the SIMD lane expressed in the instruction. Data processing operations operate on 64 bits of information at the same time, but may treat the information as eight bytes, four half words, two words or one long word according to a protocol defining the degree of packing of objects for packed data processing operations.

The degree of packing of objects is defined according to the following protocol:

B—8 bit objects (also referred to as bytes $B_0 \ldots B_7$);
H—16 bit objects (also referred to as half words $H_0 \ldots H_3$);
W—32 bit objects (also referred to as words $W_0 \ldots W_1$);
L—64 bit objects (also referred to as long words L);

A Dual operation is a special type of operation which uses even/odd pairs of registers to perform operations on 128 bits of information at the same time:

DL—128 bit objects (also referred to as double long words DL).

In the case of floating point processing operations data may be handled with two differing degrees of precision, namely:

S—32 bit floating point values (also referred to as single precision); and
D—64 bit floating point values (also referred to as double precision).

Simultaneous execution in the twin X and Y-side units under the control of a single 32 bit instruction portion is referred to herein as Dual Instruction Multiple Data (DIMD). However, such operations may be regarded as two SIMD instructions being performed in parallel. In general, data operations employ a first operand and a second operand (which may be an immediate value) to produce a result. Each operand is obtained from a source register (unless it is an immediate value) and the result is sent to a destination register.

Figure 3:
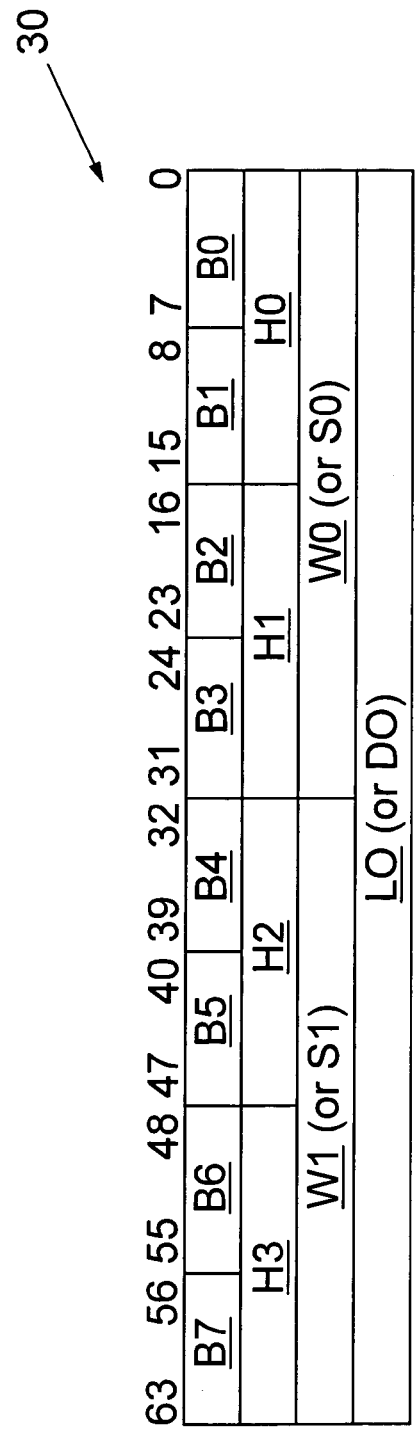
FIG. 3 illustrates differing degrees of packing in a general purpose register for holding packed objects defining operand lanes.

FIG. 3 illustrates how a general purpose register such as an R-register 30 may contain 64 bits of information allocated as eight bytes ($B_0$–$B_7$), four half words ($H_0$–$H_3$), two words ($W_0$, $W_1$) or a single long word ($L_0$). Similarly, floating point values may be stored as 32 bit single precision values $S_0$, $S_1$ or as 64 bit double precision values. Some of the R-registers may be reserved for special purposes. For example in this embodiment, Register 63 is hard wired to zero (referred to herein as the "Zero Register"). Register 62 is hard wired to ones (referred to herein as the "Ones Register"). Registers 61 and 60 are banked registers. Registers 56–59 are also banked for interrupt purposes. The Zero Register may be used for providing zero as an input to operations and nullifying actions (e.g. discarding the permanent link in branches). Some data processing operations use even/odd pairs of registers as source and destination.

M-registers are able to contain a double sized product plus a single byte for each SIMD lane. For example, an M-register used to accumulate byte multiplies contains 8 sets of 16+8 bits, where 16 bits is the double size product for a byte and 8 bits is the overflow allowed in the accumulator. Likewise, when used to accumulate half word multiplies an M-register contains 4 sets of 32+8 bits and contains 2 sets of 64+8 bits when used to accumulate word multiplies.

For each channel 5x, 5y, if the instruction defines a data processing unit it is supplied to the appropriate unit of the MAC, INT and the GFU and if it defines a load/store operation it is supplied to the LSU. Data values may be loaded to and from the MAC data processing units into and out of the M-registers 10 along register-access paths 12x and 12y. Data values may be loaded to and from the INT, GFU and load/store units into and out of the R-registers along register access paths 14x and 14y. Each register access path can carry register data between the accessing unit, two source addresses src1, src2 and a destination address dest as specified in the instruction. The register access paths also carry control data to and from the control registers 13.

In the case of data processing operations, the source addresses src1, src2 define registers in the register files 10 and 11, which hold source operands for processing by the data processing unit. The destination address dest identifies a destination register into which the result of the data processing operation is placed. An optional field in the instruction defines a predicate register in cases where the operation defined in the instruction is to be performed conditionally on multiple SIMD lanes. The operands and results are thus conveyed between the register files 10, 11 and the respective functional unit via the access paths 12, 14. In certain types of data processing operations src2 may be replaced by an immediate value as will be explained later.

In the case of load/store operations, instruction formats use predefined addressing modes to allow memory access addresses Ax, Ay to be formulated from data values held in the registers. The load/store units access a common address space in the form of a data memory (not shown) via the dual ported data cache 15. For this purpose each load/store unit has a 64 bit data bus Dx, Dy and a 64 bit address bus Ax, Ay.

Figure 4:
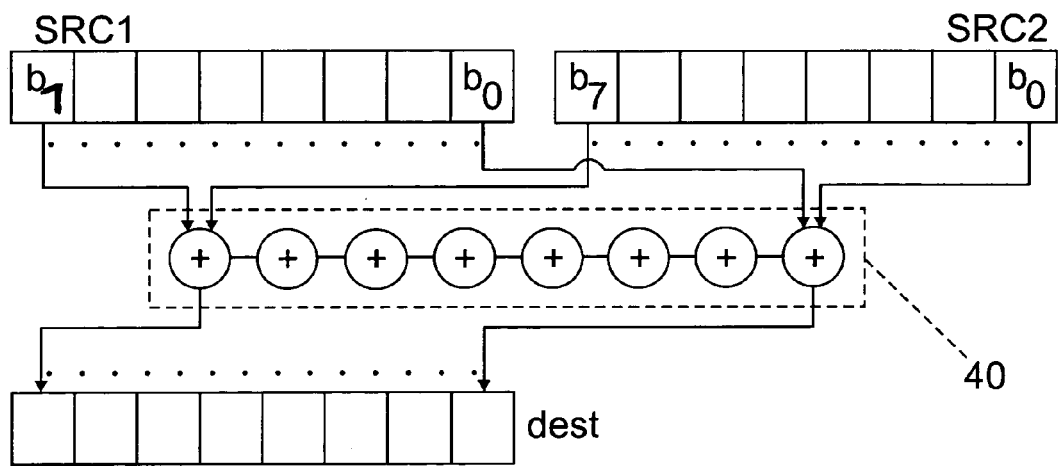
FIG. 4 is a schematic diagram illustrating how an operation is performed on respective lanes of a packed operand.

FIG. 4 illustrates schematically how data processing operations performed in the various functional units are capable of acting on 64 bits of information simultaneously on a per SIMD lane basis. In general, operations may be regarded as working in vertical lanes having a width corresponding to the size of the packed objects of the operands. Assume a 32 bit instruction causes an ADD data processing operation. The ADD instruction has the following semantics ADD{B/H/W} dest, src1, src2. The operation shown in FIG. 4 is an ADDB operation and thus treats the data as byte packed data. The instruction specifies first and second 64 bit source registers src1, src2, each source register containing byte packed operands for the addition operation. The instruction also specifies a 64 bit destination register dest for holding the result of the addition operation. A first plurality of byte sized operands $B_0$–$B_7$ are held in the first source register src1. A second plurality of byte sized operands are held in the second source register src2. Addition circuitry 40 connected between the source and destination registers comprises eight operators, in this case addition circuits. Each operator is connected to receive two byte sized objects, one from each lane $B_0$–$B_7$ of the source registers src1, src2 (only selected connections are shown in FIG. 4). The operators perform the ADD operation on the byte packed objects and the results are sent to equivalent bit locations in the destination register dest. Alternative versions of the ADD instruction, namely ADDW and ADDH, treat the 64 bits of data as two words and four half words respectively. It is of course possible for some operations to work horizontally (i.e. across columns in a row).

The computer system of FIG. 1 provides for conditional execution of multiple data processing operations on a per SIMD lane basis, lane size being defined by the degree of packing of operands. To achieve this the control registers 13 include eight predicate registers pr0–pr7 such as that illustrated in FIG. 5. Each predicate register 50 is eight bits 0–7 in size, having one bit value (TRUE or FALSE) for each of the eight byte lanes $B_0$–$B_7$. The individual bits of a predicate register can be set TRUE or FALSE as desired. When an SIMD instruction is processed the operation defined in the instruction is only performed on byte lanes where the controlling predicate register bit is TRUE. No operations are executed on byte lanes where the controlling predicate register bits are FALSE. In this embodiment, one predicate register pr7 is permanently set with all bits TRUE. The predicate registers can be accessed from both the X and Y-sides of the machine for the purposes of being set and of controlling conditional execution.

An instruction for an operation which is to be conditionally executed per lane includes a field indicating which of the eight predicate registers should control the operation defined in the instruction. The decode circuitry includes control circuitry for determining a controlling predicate register from this field, and flags within the controlling predicate register are checked by predicate checking circuitry. Each bit 0–7 of the designated predicate register controls the correspondingly numbered byte lane $B_0$–$B_7$ used in the operation. That is, bit i of the designated predicate register controls the conditional execution of SIMD byte lane i. Non-SIMD instructions are controlled by bit 0 of the designated predicate register and therefore the entire non-SIMD operation is executed in dependence on whether or not that bit is TRUE or FALSE.

Figures 5, 6A:
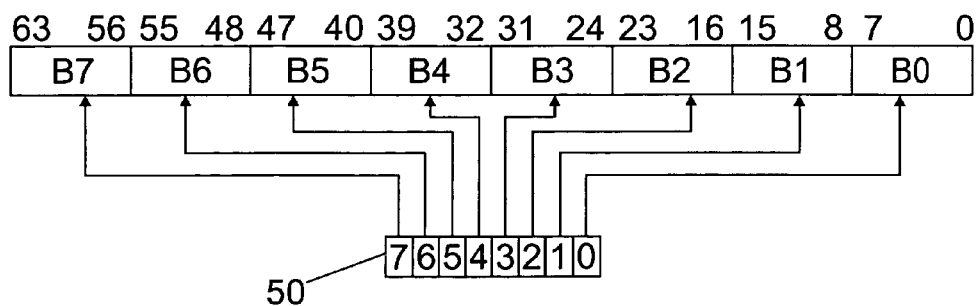
FIG. 5 is a schematic block diagram illustrating a predicate register.
FIG. 6A illustrates a number of 64 bit long instruction words.

FIGS. 6A and 6B show examples of instruction formats for use with the computer system of FIG. 1. The instruction formats use 64 bit long instruction words. The X and Y side operations are generally independent, although registers may be shared. An opcode major field comprises the first two bits of each instruction portion (i.e. bits 63, 62, 31, 30) The opcode major field in combination with the opcode field defines the type of operation to be performed.

Referring to FIG. 6A, the normal long instruction format 20a comprises an X-side 32 bit instruction portion and a Y-side 32 bit instruction portion packed into a single 64 bit instruction. Each 32 bit instruction portion may take any of the 32 bit formats disclosed in FIG. 6B. These 32 bit instruction formats may define a single operation or two separate operations which may be freely mixed (i.e. used in any combination). For example, it is possible to perform eight separate byte adds and four separate half word multiplies at the same time, the add and multiply operations being defined in separate halves of the long instruction. In this example, the X-side opcode major field defined by bits 63, 62 takes a value from 0–2, with bits 61–32 available as an X-side opcode field. Likewise, the Y-side opcode major field defined by bits 31, 30 takes a value from 0–2, with bits 29–0 available as a Y-side opcode field. Thus, in the case of normal instructions these opcode major fields take values from 0–2, with the value of 3 being reserved for special operations.

This embodiment also supports a long immediate instruction 20b in which a 32 bit immediate value is defined by bits in both the X and Y-side portions of the instruction. The X-side of the instruction defines the beginning of the long immediate value and the Y-side of the instruction carries the extra bits to make up the long immediate value. The X-side opcode major field defined by bits 63, 62 takes a value 0–2 and opcode bits 61–32 define a first operand together with a first 8 bit portion of the long immediate value. The Y-side opcode major field defined by bits 31, 30 takes a value of 1 and the opcode bits 29–0 contain the additional 24 bits required to specify a 32 bit immediate value. Long immediate instructions are thus 64 bit instructions which allow most of the Register/Immediate ALU operations to be performed using a 32 bit immediate value. Long immediate instructions are performed on the X-side of the machine while the Y-side of the machine is redundant.

A data processing operation may be combined with a load store operation. The data processing operation is defined in the X-side instruction portion (bits 63–32) and the load/store operation is defined in the Y-side instruction portion (bits 31–0). According to a special case, dualable load/store operations allow movement of 128 bit values into and out of consecutive (paired) 64 bit registers and may be combined with dual execute operations (e.g. ALU2 or MAC2 operations) which act on all operands held in the paired registers at the same time. Dual execute operations use even/odd pairs of registers for the two source registers and the destination register and execute on both the X and Y sides of the machine simultaneously. Dual execute operations can be performed conditionally under the control of pairs of predicate registers. Referring to the long instruction format designated by reference numeral 20c, the X-side opcode major field defined by bits 63, 62 takes a value of 0–2 and define an operation (for example, an ALU or ALU2 operation). The load/store operation is defined by the opcode major field (bits 31, 30) which takes a value of 3 and opcode bits 29–0. The load/store operation runs on the Y-side of the machine.

Another long instruction format 20d using an X-side instruction portion having an opcode major field of 3 and Y-side opcode major bits taking a value of 0–3 is reserved for special functions not defined herein.

FIG. 6B shows examples of 32 bit instruction formats which this embodiment uses to define the or each operation in the long instruction word. In each case an optional predicate register field (Psrc) indicates which of the eight predicate registers controls per lane execution of the operation defined in the instruction.

In general, all src/link fields designate R registers. The src1 and dest fields may designate R register pairs. The dest field may designate an R-, M- or predicate register.

Register/Register instructions 22a provide a full set of SIMD data processing operations. Operands are taken from first and second register sources and the result is allocated to a destination register. In general Register/Register 32 bit instruction formats 22a include a controlling predicate field (Psrc, bits 0–2), a destination register field (Gdest, bits 3–8) and two source register fields (Gsrc1, bits 9–14; and Gsrc2, bits 15–20) and an opcode major field taking a zero value (bits 31, 30). The remaining bits are available as opcode bits to define the operation. For compare/test operations the Gdest field indicates a predicate register to be written to as will be illustrated later For MAC operations the Gdest field designates an M-register.

Register/Immediate instructions 22b provide a set of SIMD data processing operations using as operands the contents of a source register and a (replicated) immediate value. The result is placed in another register. To perform this type of operation the second source register is replaced with an 8 bit immediate value Imm8. Thus, Register/Immediate instructions 22b include a controlling predicate field (Psrc, bits 0–2), a destination register field (Gdest, bits 3–8), a source register field (Gsrc1, bits 9–14), an immediate field (bits 15–22) and an opcode major field taking a value of 1 (bits 31, 30), with remaining bits available to define the operation. The immediate field is an 8 bit value representing a number between 0–255. Immediate values are extended by zeros to the lane size of the SIMD operation (b, h, w, l) and then replicated across each of the SIMD lanes.

As mentioned with reference to FIG. 6A long immediate instructions are 64 bit instructions allowing register/immediate operations to be performed with 32 bit immediate values. Long immediate instructions are run on the X-side of the machine. A 24 bit immediate extension is needed on the Y-side of the machine. An example of a 32 bit instruction portion indicating a 24 bit immediate extension value is designated by reference numeral 22c. Instruction portions carrying 24 bit immediate extensions have an opcode major field taking a value of 1 (bits 31, 30).

Thus, it will be apparent that in 32 bit data processing instruction formats 2 bits are used in the opcode major field, 6 bits are used in each register field to indicate source and/or destination registers, 3 bits are used in a predicate field to indicate which, if any, of the eight predicate registers should control conditional execution per lane. The remaining opcode field bits are generally used to provide information on the type of operation, which information is decoded taking into account the values in the X- and Y-side opcode major fields. Where 8 bit or 32 bit immediate values are specified in instructions additional bits are required over and above those required to indicate a register holding a value. That is, two further bits are required to specify an 8 bit immediate value and a total of 26 further bits are required to specify a 32 bit immediate value.

The instruction formats 22d, 22e and 22f specify load/store operations employing a range of standard addressing modes. According to this embodiment, loads fetch a single value, i.e. a byte, half word, word or a long word from memory into a register. Where a small value is loaded, the value is loaded into the bottom of the register in question. Where a full 64 bit register has been loaded the value may be treated as a single long word, as two words, four half words or eight bytes. Store operations write a single value, i.e. a byte, half word, word or long word from a register to memory. Where a value is smaller than a register being used, the bottom part of the register is used. Where a full 64 bit value is stored, the contents can be treated as a single long word, two words, four half words, or eight bytes. Even/odd register pairs are provided to accommodate double long word (i.e. 128 bit) load/store operations.

Referring to the 32 bit instruction format 22d load/store register/register operations move register data between a register Gdata and memory. The instruction format 22d includes a controlling predicate field (Psrc, bits 0–2), a base register field (Gbase, bits 3–8), a data register field (Gdata, bits 9–14), an index field (Gsrc2 (index), bits 15–20), a scale field (scale, bits 21, 22), a word indicator field ($W_{1/0}$, bit 24), a write back indicator field ($W_6$, bit 25) and an opcode major field (bits 30, 31) taking a value of 0.

Referring to the 32 bit instruction format 22e load/store register/offset operations permit load/store operations with data locations defined by an offset coded as a 9 bit twos complement value. This instruction format has some fields in common with the instruction format 22d and these fields have the same definitions here Load/store register/offset instructions include a 9 bit immediate value (Imm9, bits 15–23) used to specify an offset in place of the index value register field. Also included is an "address modify" indicator field (am, bit 25) and an opcode major field (bits 30, 31) taking a value of 2.

Referring to the 32 bit instruction format 22f, a special class of dualable load/store operations may be placed on the Y-side of the machine at the same time as a data processing operation is placed on the X-side of the machine. A dualable load/store instruction includes a type field (Id, bit 27) specifying either a load or a store function, a Y-side dual indicator field (Is2, bit 28) controlling whether the contents of one or two registers should be transferred in the load store operation, an X-side dual indicator field (ps2, bit 29) controlling whether or not the X-side data processing operation is to be mirrored on the Y-side, and an opcode major field taking a value of 3. Where the load/store operation is dualled two memory addresses are generated. For example, the bit sequence representing an offset would be supplied from the original Y-side instruction position to both the X- and Y-side load/store units. In this embodiment, the path to the Y-side load/store unit supplies the offset unaltered to the Y-side load/store unit, whereas the path to the X-side load/store unit includes a unitary operator which selectively alters the logical value of at least one bit in the offset bit sequence such that a different memory address is accessed by the X-side. When an X-side data processing operation is mirrored on the Y-side, the various fields of the data processing instruction are additionally transferred to the relevant unit(s) the Y-side with relevant values thereof having been adjusted as necessary. For example, where the X-side data processing operation is mirrored on the Y-side, "even" source and destination register addresses are supplied to the relevant functional unit on the Y-side, whereas corresponding "odd" register addresses are supplied to the functional unit on the X-side.

The above load/store instruction formats can define load/store instructions using six standard addressing modes. These address modes are illustrated in Table 1.

TABLE 1

| | Semantics | Function |
|---|---|---|
| 1 | [<rbase>, <reg>, {$W_0/W_1$} {<<shift>}] | base + scaled pre-indexed |
| 2 | [<rbase>, <reg>, {$W_0/W_1$} {<<shift>}] ! | base + scaled pre-indexed with write back |
| 3 | [<rbase>, # <offset>] | base + offset pre-indexed |
| 4 | [<rbase>, # <offset>] | base + offset scaled pre-indexed |
| 5 | <rbase>, # <offset> ! | base + offset pre-indexed with write back |
| 6 | [<rbase>], # <offset> ! | base + offset post-indexed with write back |

In table 1, < > denotes a mandatory field, { } denotes an optional field and / delimits a list of choices. Where {$W_0/W_1$} is present but not specified the default is $W_0$. Scale values may be <<1, <<2, or <<3.

A first type of address mode (1) uses a base register plus a scaled register pre-indexed addressing mode. According to this mode the address is the unsigned 64 bit contents of the base register plus the signed 32 bit contents of the index register, optionally shifted by the shift amount.

A second type of address mode (2) employs a base register plus scaled register pre-indexed address mode with a write back function. According to this mode the address is the unsigned 64 bit contents of the base register plus the signed 32 bit contents of the index register, optionally shifted by a shift amount. The value generated is then written back to the base register.

A third type of address mode (3) uses a base register and an immediate offset (pre-indexed). According to his mode the address is the unsigned 64 bit contents of the base register plus an immediate offset. The immediate offset can of course be a positive or negative value.

A fourth type of address mode (4) uses a base register and an immediate offset scaled to long words (pre-indexed). In this case the address is the unsigned 64 bit contents of the base register plus the immediate offset scaled to long words. The assembler works out which of the two address forms is required, for example using the non-scaled form.

A fifth type of address mode (5) uses a base register and an immediate offset (pre-indexed) with a write back function. The address is the unsigned 64 bit contents of the base register plus the immediate offset and is written back to the base register.

A sixth type of address mode (6) uses a base register and an immediate offset (post-indexed) with a write back function. In this case the address is the unsigned 64 bit contents of the base register. However, the value of the base register plus the immediate offset is computed and written back to the base register.

The instruction formats 22g and 22h of FIG. 6B specify branch operations which in this embodiment may only be issued on the X-side of the machine. The machine can perform long and short branches. Branch instructions to be executed conditionally test the TRUE/FALSE values of bits in predicate registers designated in the Psrc field of the instructions. Long and short instructions are used to implement conditional branches in essentially the same manner as will be described below. A branch may be taken if a particular predicate register bit is TRUE or FALSE and if any or no bits in the predicate register are TRUE. If the branch condition is met, a branch target address is generated and the result is placed back in the PC register. The execution unit thus moves to the branch target address on the next fetch cycle. The old PC register value can be saved in a link register, this allows the called routine to return to the next instruction at a later time. If the branch condition is not met, then no branch target address is generated and the computer system continues executing by moving to the next instruction in the sequence.

The 32 bit instruction format 22g is a short instruction format defining the branch target address by means of a value held in a register. Such register values represent a way to change the program counter to an absolute value, to a value from a call saved in a link register or on a stack or to a calculated value. The instruction format has an opcode major field taking a value of zero. The Gsrc field defined by bits 15–20 designates the register holding the branch target address information. The instruction includes an optional predicate register field Psrc (bits 0–2) which indicates the predicate register to be accessed in order to establish whether or not to take the branch. The link register field Gdest (bits 3–8) defines a register for saving the current program count. If a link register field designates the zero register the program count is in effect discarded. The P bit field (bits 12–14) is an optional field indicating a specific bit in the designated predicate register. This field is used in branch operations performed conditionally in dependence on the state of a single bit TRUE/FALSE value within a predicate register. The hint field (bit 24) indicates whether or not a branch is likely to be taken. Enabling a programmer to set this field removes the need to store large quantities of history information in order to predict likelihoods.

The 32 bit instruction format 22h may be used to define another type of short branch instruction. This instruction format has an opcode major field of 1. This instruction format has a number of fields in common with the instruction format 22g. These common fields serve corresponding purposes and are not discussed again here. An offset is used to define the branch target address. The Imm9 field (bits 15–23) specifies the offset in the form of a 9 bit immediate value.

Where an offset is defined by an immediate value, an immediate extension field may be used to extend the 9 bit immediate value to a 32 bit immediate value This is achieved by combining instruction format 22h with the instruction format 22c to generate a long branch instruction defined by a 64 bit instruction word. Short branch instructions may be performed in parallel with other instructions, whereas long branch instructions cannot. For an immediate offset, a value of 0 causes the execution unit to move to the next instruction and a value of 1 causes a branch to the next but one instruction. The total range of a long branch instruction is −2147483648 instructions to +2147483647 instructions. The range of short branch instructions is −256 instructions to +255 instructions.

The full instruction set will depend on the application. For example, the instruction set is generally capable of executing standard computer languages (such as C, C++ and Java) but is primarily designed for special purpose functions employed in, for example, encoding/decoding communication signals, video processing (e.g. compression, decompression and filtering signals), three-dimensional graphics, image processing, compressing and decompressing moving images and sound, performing voice and/or image recognition functions. A skilled person would readily appreciate that to achieve efficient implementation over a variety of applications it may be necessary for the binary code to differ from one embodiment to another. However, it is possible for all implementations to be compatible at assembly language level and higher levels.

Figure 7A:
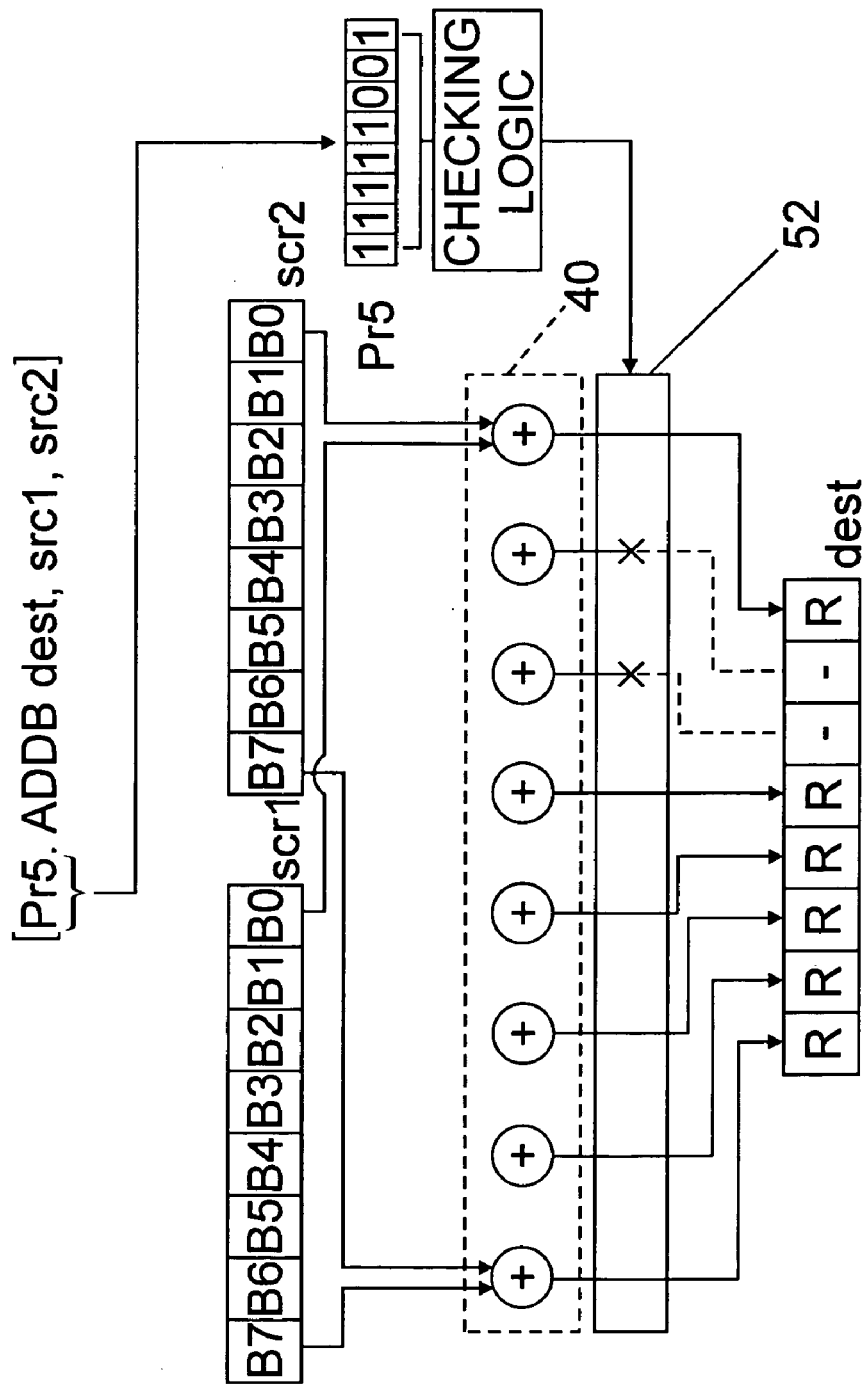
FIG. 7A schematically illustrates an operation performed conditionally on byte sized packed objects.
Figure 7B:
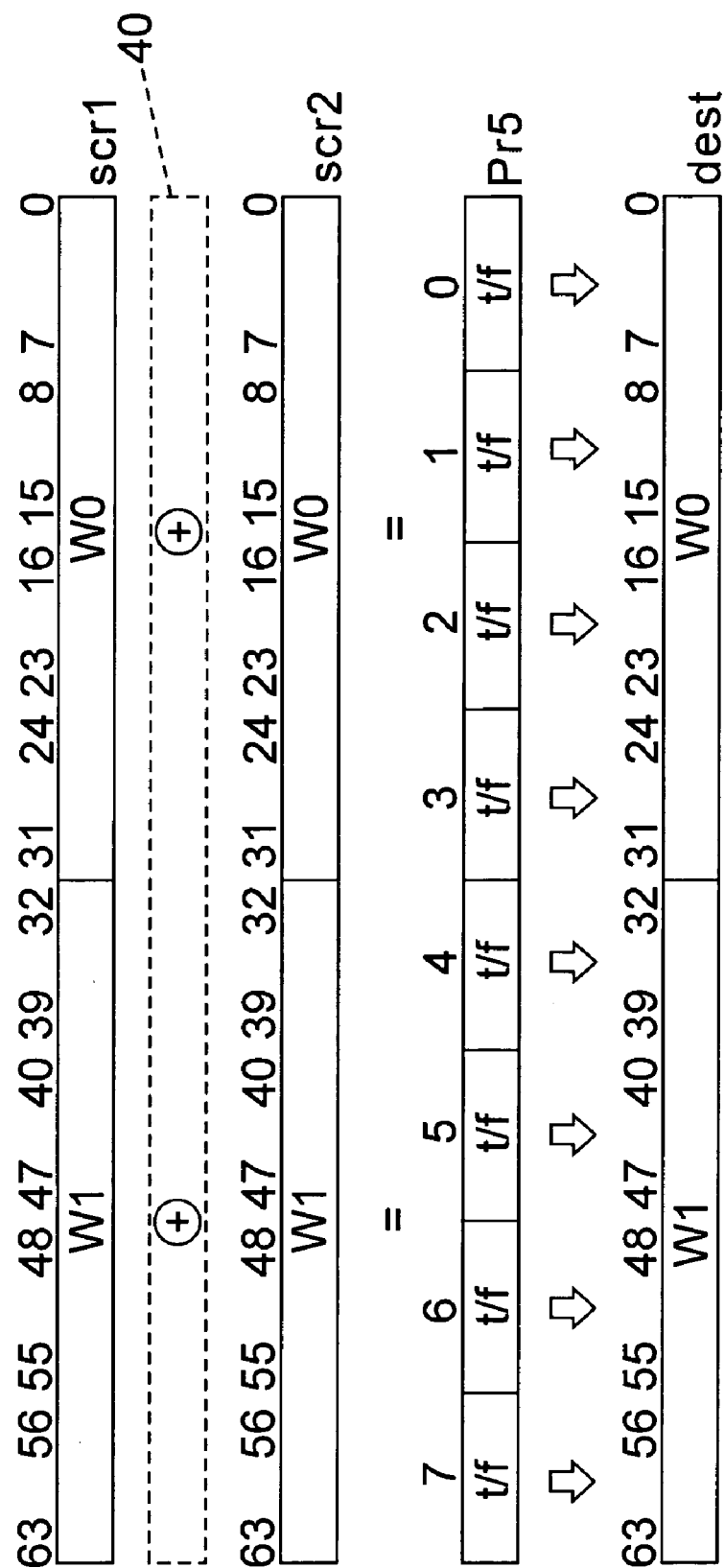
FIG. 7B schematically illustrates an operation performed conditionally on word sized packed objects.

FIGS. 7A and 7B illustrate how operations defined by the instruction formats of FIGS. 6A and 6B may be performed conditionally on individual SIMD lanes irrespective of the lane size. FIG. 7A is an example of byte level conditional execution and FIG. 7B is an example of word level conditional execution. For clarity, the predicate registers illustrated schematically in FIGS. 7A and 7B are shown enlarged such that individual bits of the predicate registers correspond in size to byte lanes of the operands.

FIG. 7A shows per lane conditional execution of a SIMD ADDB instruction which treats the register data as eight separate bytes of information. In this example, the ADDB data processing instruction has the following semantics. {Psrc} ADDB dest, src1, src2. Thus, the instruction specifies a first 64 bit source register src1, a second 64 bit source register src2 and a destination register dest. The optional Psrc field specifies a predicate register to control conditional execution of each of the SIMD lanes. Each source register src1, src2 contains a plurality of byte sized operands for the addition operation and the destination register dest is for holding the results. The Psrc field indicates the predicate register pr5 as the controlling predicate register for the operation. The ADDB operation is executed conditionally on a per lane $B_0$–$B_7$ basis with byte level predication determined by the TRUE/FALSE values of the corresponding bits 0–7 of the predicate register. Corresponding byte sized objects are supplied to addition circuitry 40 as described in relation to FIG. 4 An output from predicate checking logic controls a set of switches 52, one for each byte lane $B_0$–$B_7$. These switches control whether or not the results of the addition operation are written to the corresponding byte lane of the dest register. Since in this example bits 0, 3, 4, 5, 6 and 7 are TRUE only the results for byte lanes $B_0$, $B_3$, $B_4$, $B_5$, $B_6$, $B_7$ are written to the destination register. The results for byte lanes B1 and B2 are not written to the destination register since predicate bits 1 and 2 are FALSE, as illustrated by the crosses on FIG. 7A.

FIG. 7B is a simplified schematic illustration omitting apparatus features. In this example an ADDW instruction specifies that register data should be treated as words the operation is performed at word level. Predication is performed in the same way as before (i.e. at byte level) with bits 0–3 of the predicate register controlling conditional execution of the first word lane $W_0$ and bits 4–7 of the predicate register controlling conditional execution of the second word lane $W_1$.

Thus, using the above-described predication technique operations can be performed conditionally on packed objects of any predetermined size. Operations defined in the instruction formats are carried out on each "lane" of the operand, that is on each pair of corresponding packed objects in respective source registers src1, src2 or source register and immediate value as the case may be.

Setting operations can be used to set bits of the predicate registers in dependence on predetermined test conditions. Predicate setting instructions have the following general form:

{Psrc}.SETOP TSTID B/H/W Pr$, src1, src2

The {Psrc} is an optional field which may be used to designate a controlling predicate register if the predicate setting operation is to be predicated. The SETOP field specifies the type of operation which will be used to set the predicate register. For example, the TRUE/FALSE values of the bits in predicate registers can be set by a specific integer arithmetic comparison operation (CMP), a boolean bit test operation (TST) or a floating point comparison operation (FCMP). The TSTID field indicates the test to be performed. For example, in the case of compare operations an arithmetic test is specified in this bit sequence, for boolean test operations a logical test is specified and for floating operations a floating point test is specified. The Pr$ field designates one of the eight predicate registers to be set. The src1 and src2 fields specify first and second operand source registers for the predicate setting operation. Thus, instructions defining predicate setting operations do not have a destination field as such. The 6 bits used to specify a destination register for data processing operations, namely the Gdest field of instruction formats 22a and 22b (see FIG. 6B) are used differently. TSTID and Pr$ fields each require 3 bits and occupy a bit sequence equivalent in size to the destination register field of a data processing operation. In this embodiment, the B/H/W/L indication of an instruction is encoded as part of the opcode field. In other embodiments, different encoding schemes may be used. For example, it would be equally feasible to design a binary encoding scheme with a special 2 bit field carrying this information.

A class of ORSET tests set the destination predicate register only if the result is TRUE. For example, a "compareOR" operation sets predicate register bits only if the result of a compare operation is TRUE. That is, a positive result sets to TRUE and a negative result gives no change. This is achieved by predicating the writing of the value in the destination register with the value itself. The instruction CMPORLEB, Pr1, src1, src2 provides an OR test applied between the old Pr1 bit value and the result of the comparison operation src1≦src2. Thus, overall a Pr1 bit value is set TRUE if either the old OR the new result is TRUE. Again, the assembler language may use synonyms for related types of operation (e.g. CMPOR, TSTOR, FCMPOR).

Table 2 illustrates SETOP and TSTID fields for various types of predicate setting operation.

TABLE 2

| SETOP | TSTID | FUNCTION | EXAMPLE |
| --- | --- | --- | --- |
| CMP | GT | Signed greater than | e.g. CMPGT |
|  | HI | Unsigned higher than |  |
|  | LE | Signed less than or equal |  |
|  | LS | Unsigned lower than or same |  |

TABLE 2-continued

| SETOP | TSTID | FUNCTION | EXAMPLE |
|---|---|---|---|
| FCMP | EQ | Equal | e.g. FCMPGT |
|  | NE | Not equal |  |
|  | GE | Greater than or equal |  |
|  | GT | Greater than |  |
|  | LE | Less than or equal |  |
|  | LT | Less than |  |
|  | NF | Infinity of NaN |  |
|  | UN | Unordered |  |
| TST | EQ | Equal | e.g. TSTNE |
|  | NE | Not equal |  |
|  | ZE | Zero (for bitwise AND) |  |
|  | NZ | Not zero (for bitwise AND) |  |
|  | BC | Bit clear |  |
|  | BS | Bit set (dyadic by bit number) |  |

Typically the SETOP and TSTID fields are combined in a single large field.

CMPOR type operations can employ the same tests as the CMP type operations. FCMPOR type operations can use any test indicated for FCMP operations. TSTOR operations can use the same tests as TST operations.

Predicate setting operations set respective bits of the predicate register designated in the instruction in dependence on the result of the test on each byte lane. In predicate setting instructions the destination register field indicates a predicate register. Byte level tests set respective individual bits in the designated predicate register to the result on each byte lane. Half word tests set adjacent bit pairs in the designated predicate register to the result of the test on each half word lane. Likewise, word level tests set groups of four adjacent bits in the designated predicate register to the result of the test on each word lane and long word tests set all eight bits in a predicate register to the result of the long word test.

Figures 8A, 8B:
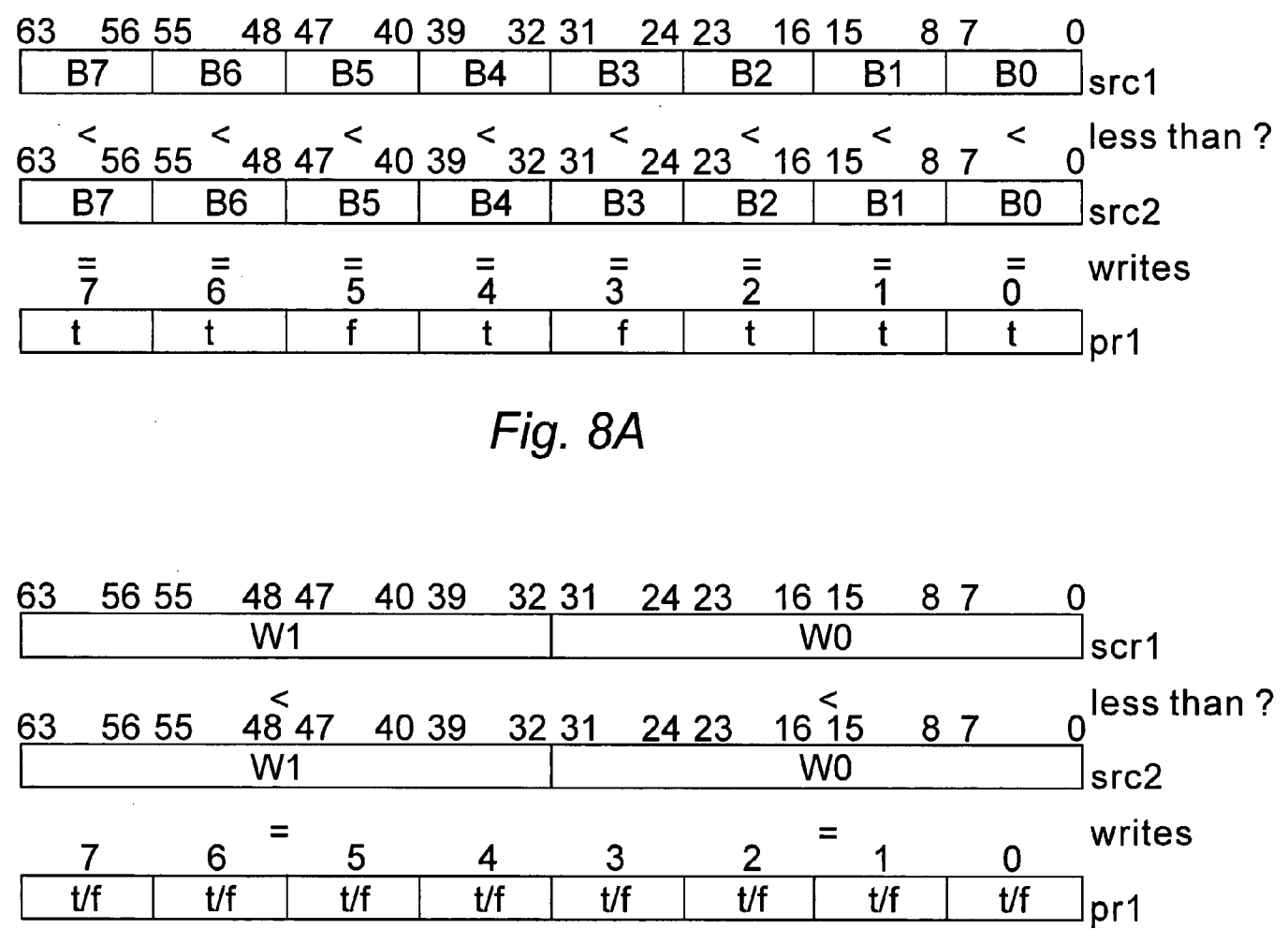

FIG. 8A illustrates how a comparison operation, such as a specific integer arithmetic comparison on byte sized packed objects (CMPLTB) can be used to set individual TRUE/FALSE values in a predicate register. An instruction format based on the Register/Register instruction format designated by referenced numeral 22a of FIG. 6B is used to define this compare operation. The "compare less than" instruction has the following semantics: {Psrc}.CMPLT{B/H/W} dest, src1, src2. The first and second source fields src1, src2 specify registers holding values to be compared in the operation and the destination register field dest indicates a predicate register to which the results are to be written. The Psrc field is an optional field used to indicate a controlling predicate register. In this example, the instruction CMPLTB Pr1, src1, src2 compares byte sized packed objects held in the first source register src1 with corresponding byte sized packed objects in the second source register src2 to test on a per lane $B_0$–$B_7$ basis whether values in src1 are less than corresponding src2 values. The test result for each lane is written to the corresponding bit position 0–7 in the predicate register pr1. That is, for each lane the corresponding bit in the predicate register pr1 is set TRUE (1) if the less than test applies and FALSE (0) otherwise. In this example, the less than test is positive for byte lanes $B_0$, $B_1$, $B_2$, $B_4$, $B_6$, $B_7$ and negative for byte lanes $B_3$ and $B_5$. As a result, bits 0, 1, 2, 4, 6 and 7 of the predicate register are set TRUE (1), whereas, bits 3 and 5 are set FALSE (0).

FIG. 8B is a schematic diagram illustrating that operations on packed objects of any predetermined size may be used to set a plurality of TRUE/FALSE values in predicate registers simultaneously. In this example a word level comparison operation is used to write to sets of 4 bits in a predicate register. According to the instruction CMPLTW Pr1, src1, src2, word sized packed objects held in the first source register src1 are compared with corresponding word sized packed objects in the second source src2 register to test for a less than relationship. The word level comparison performs two comparison sub-operations, rather than eight or four as would be required in byte or half word comparison operations, respectively. Each comparison operation sets four bits of the predicate register at the same time. The predicate bits are set TRUE (1) if the less than condition is met and FALSE (0) otherwise. The first word $W_0$ comparison writes to predicate bits 0, 1, 2 and 3 and the second word $W_1$ comparison writes to predicate bits 4, 5, 6 and 7.

There are many types of comparison and other test operations which can apply test conditions to set predicate registers. A predicate register can be set to a state with every bit TRUE by testing the Zero Register for equality with itself. An instruction for this purpose reads TSTEQL Psrc, ZR, ZR. Likewise, a predicate register can be set to a state with every bit FALSE by testing the Zero Register for inequality with itself An instruction for this purpose reads TSTNEL Psrc, ZR, ZR.

Thus, in preferred embodiments only byte-wise (per byte) conditional execution need be supported. Predicate register setting processes employ per (operand) lane operations to set a predetermined number of predicate bits in a designated predicate register and, therefore, necessarily generate (fewer bits of condition result than would normally arise from the operation. It is possible to drive the per byte conditional execution of instructions by means of predicate setting operations using operands of any size (eg B/H/W/L). The ability to perform predicate setting operations over different (operand) lane sizes allows predicate bit setting operations to replicate predicate bits as necessary. That is, predicate setting operations can set individual bits or groups of bits simultaneously by specifying in instructions the lane size over which the setting operation is to be performed.

Byte level predicate setting operations are used to set individual bits of the predicate register TRUE or FALSE. Higher level (half word, word or long word) predicate register setting operations are used to set groups of predicate register bits TRUE or FALSE. When operations are used to set groups of predicate bits each bit within the group is set to the same TRUE/FALSE value. The predicate bits are generally, but not always, set by an operation having the same lane size as the operation to be predicated. For example, a half word level predicate setting operation is typically performed to set a predicate register for use in the predication of half word level data processing operations.

Figure 9A:
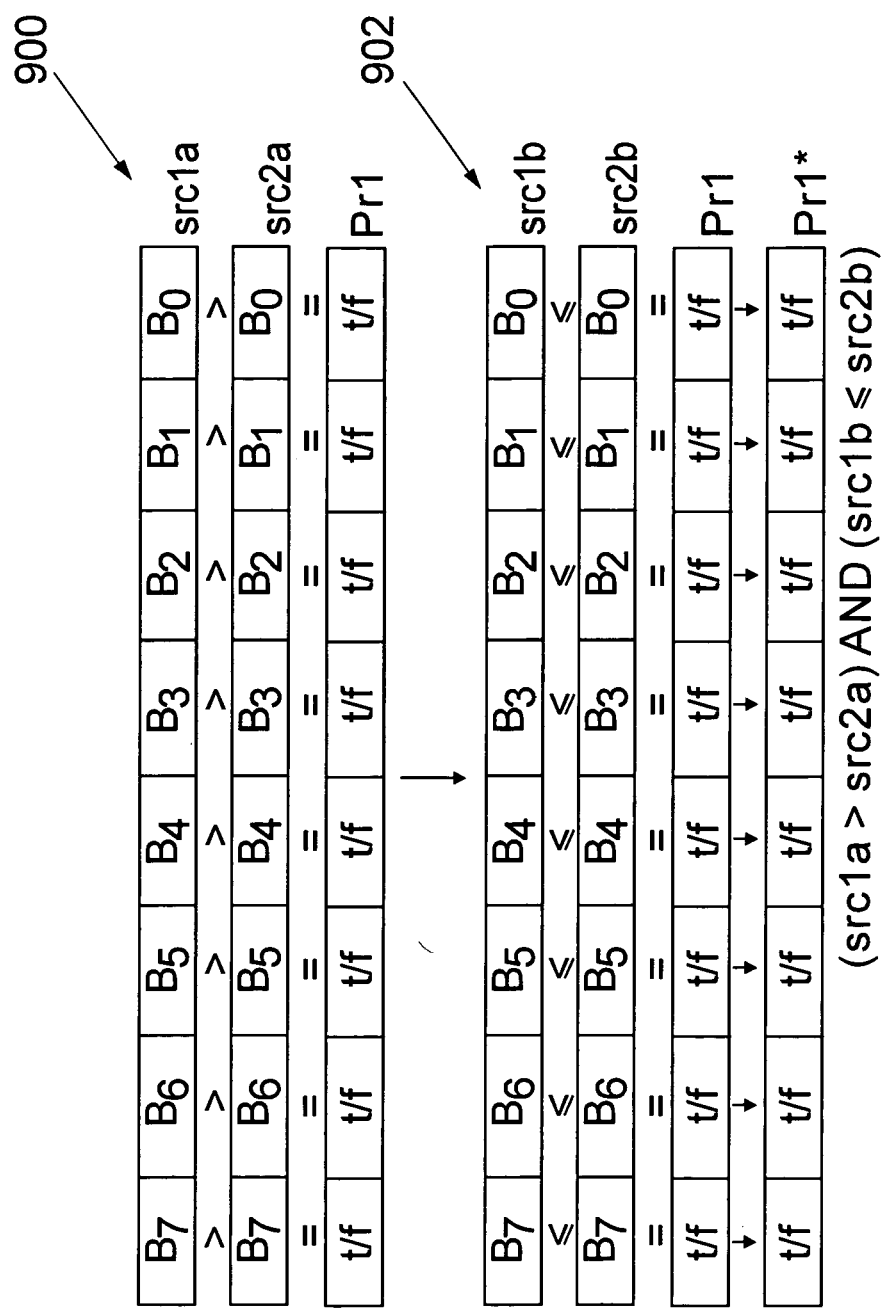
FIG. 9A illustrates a third example of a predicate register setting operation.
Figure 9B:
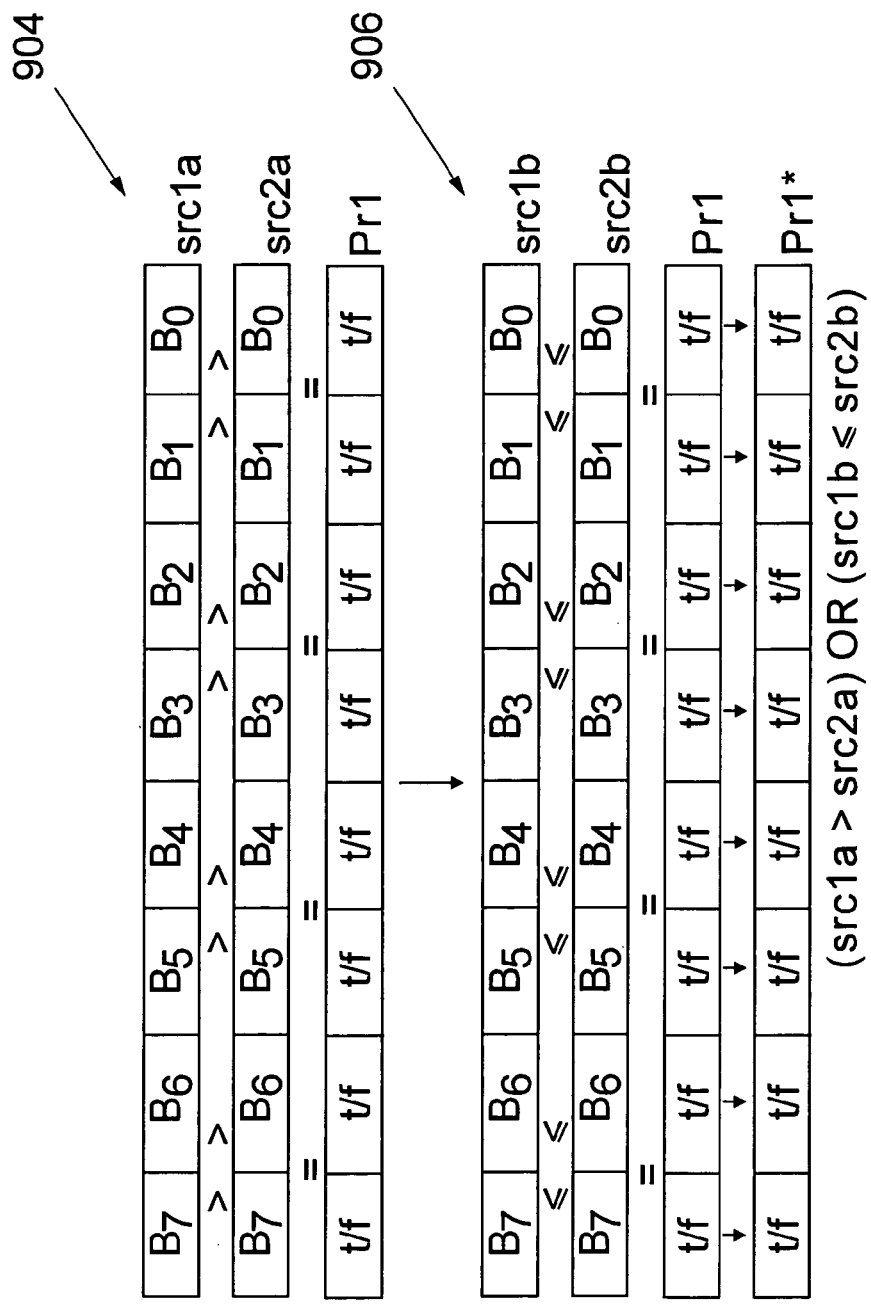
FIG. 9B illustrates a fourth example of a predicate register setting operation.

FIGS. 9A and 9B illustrate predicated execution of predicate register setting operations allowing individual bits within a predicate register to be set conditionally. Two or more consecutive setting operations can be used in combination to provide more sophisticated test conditions. For example in FIG. 9A a predicate setting condition using a logical AND test is applied to set a predicate register. A logical AND test can be performed by means of a first predicate register setting operation 900 applying a compare greater than test to a first set of values and a second predicate register setting operation 902 applying a compare less than test to a second set of values, the second compare operation being conditionally executed on a per bit lane basis under the control of the predicate register set by the first operation. That is, the first and second predicate register setting operations act on the same predicate register Pr1 Predicating a comparison operation in this way thus has the effect of ANDing the new result and the previous value. The instruction CMPGTB Pr1, src1a, src2a (defining operation 900) followed by the instruction Pr1. CMPLEB Pr1, src1b, src2b (defining operation 902) causes the predicate register Pr1* to be finally set with the result of the byte level test (src1a>src2a) AND (src1b≦src2b). The instruction Pr1 CMPLEB Pr1, scr1b, scr2b replaces respective bit values in the predicate register Pr1 with the AND of the old Pr1 bit value and the byte level comparison scr1b≦scr2b. This is because where a Pr1 bit value is FALSE it remains so since the operation is not performed on that lane and where a Pr1 bit value is TRUE it is replaced with the result of the comparison operation scr1b≦scr2b. Thus, overall a Pr1 bit value remains true only if the old AND new result are both TRUE. The assembler language may use synonyms for this and similar special classes of instructions, e.g. CMPAND, TSTAND, FCMPAND.

In FIG. 9B a predicate setting condition using a logical OR test is applied by means of a first compare operation 904 applying a greater than operation followed by a second "compareOR" 906 operation applying a less than test. For example, the instruction CMPGTB Pr1, src1a, src2a, followed by CMPORLEB Pr1, src1b, src2b, leads to a predicate register Pr1* containing the results of the test (src1a>src2a) OR (src1b≦src2b).

Further, conditions combining logical AND and logical OR functionality may be used to set predicate registers. For example, the condition A<B AND C≧D OR E=F can be coded directly using a sequence comprising comparison, predicated comparison and ORSET operations to produce a single predicate register containing the TRUE/FALSE flags for each SIMD lane of the whole expression. A suitable set of instructions for a word level predicate setting operation of this type reads: CMPLEW Pr1, srcA, srcB; Pr1, CMPGTW Pr1, srcC, srcD and TSTOREQW Pr1, srcE, srcF. Alternatively the following sequence of instructions may be used to achieve the same result: CMPLEW Pr1, srcA, srcB, CMPANDGTW Pr1, srcC, srcD and TSTOREQW Pr1, srcE, srcF.

Thus, predicated (per bit) conditional execution of predicate bit setting operations of the type described allow execution conditions based on logical "AND" to be set. These conditions can be set in the same manner regardless of operand lane size, for example using a CMPAND or TSTAND instruction.

Furthermore, predicate (per bit) conditional execution of predicate bit setting operations can also facilitate logical "OR" conditions in addition, or in alternative, to the logical AND conditions. All such condition setting operations treat operands of different sizes in the same way and thus provide a versatile and simple way of setting complex execution conditions.

Figure 10:
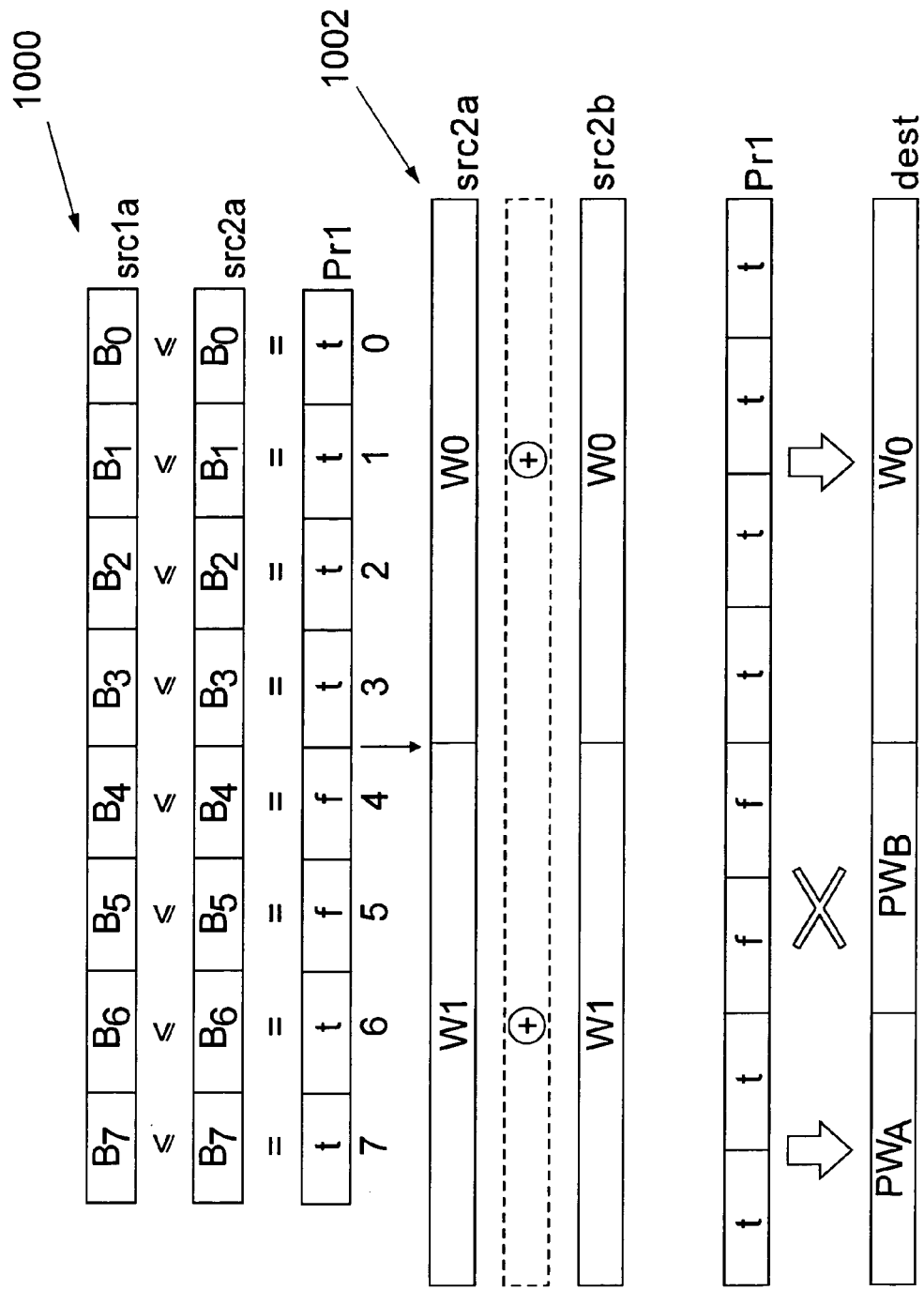
FIG. 10 illustrates a fifth example of a predicate register setting operation.

FIG. 10 illustrates how it is possible to set predicate registers using operations having a smaller lane size than the lane size of a data processing operation to be predicated. Since predication is always performed at byte level this approach allows operations to be performed conditionally on bytes within a long word, word or half word. A predicate register setting operation 1000 employs a byte level "less than or equal to" comparison to set the predicate register Pr1. The result is that bits 0–3 and bits 6, 7 of the predicate register are set TRUE, whereas bits 4 and 5 are set FALSE. A word level ADD operation 1002 performed after the predicate setting operation 1000 is executed in dependence on byte level predication. The word level ADD operation is thus executed on the entire first word $W_0$ since bits 0–3 of the predicate register are TRUE. However, since predicate bits 4, 5 are set FALSE and predicate bits 6, 7 are set TRUE, the word level ADD operation is performed only on part of the second word $W_1$. The ADD operation is performed on the part word $PW_A$ corresponding to the two most significant bytes of word $W_1$ under the control predicate bits 6 and 7. The ADD operation is not performed on the part word $PW_B$ corresponding to the two least significant bytes of the word $W_1$.

Figure 11:
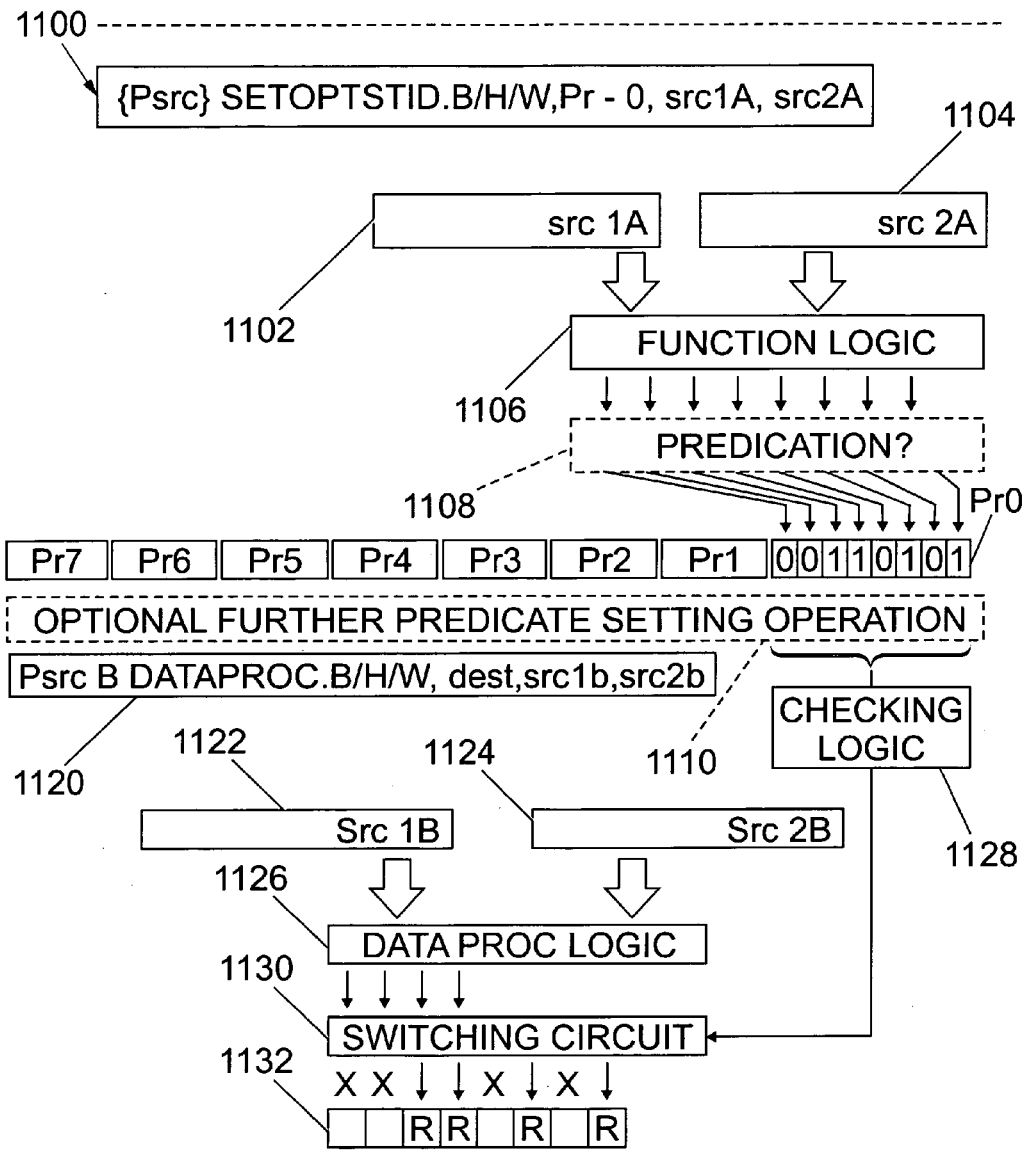
FIG. 11 schematically illustrates a sequence of instructions performed by the computer system of FIG. 1.

FIG. 11 schematically illustrates a typical sequence of operations performed by preferred computer systems. A first setting instruction 1100 defines a predicate setting operation. The instruction defines the predicate setting operation by specifying the type of operation in a SETOP field and the test to be applied in a TSTID field. The instruction also specifies two source registers Src1A, Src2A and a predicate register Pr0 to receive the results for each operand lane. The setting operation may or may not be predicated. Where a predicate register to control the setting operation is designated in a Psrc field it may or may not be the same predicate register as that designated to receive the results. According to the instruction 1100, corresponding objects from the source registers 1102, 1104 are supplied to functional logic 1106 connected to perform the operation specified in the instruction 1100. The results are written to the predicate register designated in the setting instruction 1100 with or without predication 1108. The number of adjacent predicate bits written by the setting operation depends on the size of the operand lane B/H/W specified in the setting instruction 1100.

One or more further setting operations may be performed 1110 with the results written to the same or a different predicate register as desired. Complex predicate setting conditions can be set by performing consecutive setting operations on the same predicate register.

Next an instruction 1120 to be conditionally executed (e.g. a data processing operation or a branch operation) is fetched and decoded. This instruction 1120 designates a controlling predicate register Pr0. Next an instruction 1120 to be conditionally executed is fetched and decoded. The instruction may be a data processing instruction as illustrated here or a branch instruction as described hereinbefore. This instruction 1120 includes fields designating a controlling predicate register Pr0 and defining a data processing operation DATAPROC on packed operands of a predetermined size B/H/W. The instruction also includes fields indicating first and second source registers Src1B, Src2B together with a destination register dest. In accordance with the instruction 1120 corresponding packed operands are supplied from the source registers 1122, 1124 to data processing logic 1126. Predicate checking logic 1128 accesses the designated predicate register Pr0 and controls a switching circuit 1130 to determine which SIMD lane results are written to the destination register 1132. Only results for operand lanes having a controlling predicate bit set to TRUE are written to the corresponding lane of the destination register 1132. Results for lanes controlled by predicate bits set to FALSE are not written to the destination register 1132.

Thus, preferred computer systems are capable of conditionally carrying out an operation defined in an SIMD computer instruction. The computer instruction is implemented on packed operands containing a plurality of packed objects in respective lanes. An operation defined in a computer instruction is conditionally performed per operand lane in dependence upon single bit flags which determine for each operand lane whether or not the operation is to be executed. The flags are stored in a plurality of multi-bit predicate registers. Each predicate register comprises a plurality of flags, one for each lane on which the instruction is to be conditionally executed. Instructions which are to be conditionally executed include a bit sequence designating which of the plurality of predicate registers is to control that instruction. The flags in the designated predicate register control a set of switches, one for each operand lane. These switches control whether or not the result of the operation updates the values in the corresponding lane of the destination register. The flags of a predicate register can be set simultaneously by means of general operations which write results to the predicate register.

In some operations results are written to pairs of registers at the same time. An example of an operation which normally writes results to a register pair is "Deal" bytes from a source register pair to a destination register pair. In such cases, predicate bit i controls the writing of (byte) lane 2*i and (byte) lane 2*i+1. This provides the effect of controlling the destination operand lane in the same way as the predicate bits normally control (byte) lane execution. For example, if a predicate register is set with a compare half word operation and then used to control a multiply half word operation it will control each of the four half word lanes independently. For example when the predicate register is used to multiply unsigned half words to produce words in separate registers it will control each of the four (double sized) word lanes in the same way.

Another class of operations which write to two pairs of registers at the same time is dual execute operations (eg ALU2 or MAC2 operations). Where desirable, these types of instructions can be conditionally executed in the general manner described herein but using even/odd pairs of predicate registers designated by the instruction.

An advantage afforded by the facility to conditionally execute operations on lanes of packed operands according to the preferred embodiment defined herein is that problems associated with managing information contained in test registers are eliminated. In addition, there are considerable benefits in using substantially the same instruction format for general data processing and predicate setting operations.

A skilled reader would readily appreciate that the invention should not be limited to specific apparatus configurations or method steps disclosed in conjunction with the preferred embodiment described. Those skilled in the art will also recognize that the present invention has a broad range of applications, and the embodiments admit of a wide range of modifications, without departure from the inventive concepts. For example, the preferred embodiment has been described in terms of specifically coded instructions but it will be apparent that different encoding schemes may provide the inventive concepts set out in the claims.

In this embodiment, arithmetic operations are supported for operand sizes up to 32 bits and pure bitwise logical operations are supported for operand sizes of up to 64 bits. This is not intended to be limiting.

Similarly, the architecture defined herein uses a specific apparatus configuration. However, it will be apparent that any architecture may be used with the invention. For example, the invention may be employed in machines with single or multiple SIMD data paths and with or without instruction/data caches of the type described herein.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A method for setting indicators in a control store of a computer system for conditionally performing operations, comprising:
    providing a control store setting instruction defining an execution condition and specifying a control store to be set according to the condition;
    specifying in the instruction an operand lane size over which a setting operation is to be performed, the operand lane size specified being selected from a plurality of predetermined operand lane sizes;
    performing the setting operation defined in the setting instruction on a per operand lane basis over a plurality of operand lanes;
    writing the result of the setting operation to the control store specified in the instruction to set a plurality of indicators on a lane by lane basis, wherein one or a predetermined plurality of indicators is set for each operand lane in dependence on the size of the operand lane defined in the instruction.

2. A method as in claim 1, wherein a plurality of individual indicators are set simultaneously responsive to the setting operation, one for each operand lane.

3. A method as in claim 2, wherein for each operand lane a plurality of indicators are set simultaneously responsive to the setting operation.

4. A method as in claim 1, wherein the control store comprises a predicate register.

5. A method as in claim 1, wherein the setting operation is defined in terms of an operation performed on an immediate value.

6. A method as in claim 1, wherein a setting operation is performed conditionally on a per lane basis.

7. A method as in claim 1, wherein an execution condition is defined by means of two or more control store setting operations performed successively on the same control store.

8. A method as in claim 7, wherein the results of a first control store setting operation held in the first control store are used to control execution of a second control store setting operation performed on the first control store.

9. A method as in claim 7, wherein the setting condition comprises a logical AND test.

10. A method as in claim 7, wherein the setting condition comprises a logical OR test.

11. A method as in claim 1, wherein said a setting operation is performed over an operand lane which is smaller in width than the operand lane over which a subsequent operation is performed.

12. A method as in claim 1, wherein the type of operation is specified in an operation type field and wherein the type of operation is selected from one or more of the following: an arithmetic compare operation; a logical compare operation; a floating point compare operation; another type of operation suitable for wholly or partly defining a condition for execution of an instruction.

13. A computer system for conditionally performing operations, the computer system comprising:
    a plurality of control stores each containing a plurality of indicators for controlling per lane execution of operations; and
    a computer processor that executes an instruction, the instruction comprising at least one operand field specifying an operand store; an opcode comprising a type field indicating the type of operation to be used in a control store setting operation, and specifying the operand lane size over which the setting operation is to be performed; and at least one destination field designating one of a plurality of control stores comprising indicators to be set by the setting operation according to the setting instruction on a lane by lane basis;

wherein the computer processor executes the instruction and sets one or a predetermined plurality of indicators in the designated control store for each operand lane in dependence on the size of operand lane specified in the opcode.

14. The computer system of claim 13, wherein the opcode further comprises a test field indicating a test to be applied by the operation of the type indicated in the operation type field.

15. The computer system of claim 13, wherein the control store specified in the at least one destination field is a predicate register, each indicator comprising a single bit TRUE or FALSE value.

16. The computer system of claim 13, wherein the control store specified in the at least one destination field is selected from a first predetermined number of predicate registers.

17. The computer system of claim 13, wherein the operand store specified in the at least one operand field is selected from a second predetermined number of general purpose registers, the second predetermined number being greater than the first predetermined number.

18. The computer system of claim 13, wherein a destination field designating a control store comprises a bit sequence comprising fewer bits than an operand field designating a general purpose register.

19. The computer system of claim 13, further comprising a control field indicating a control store for controlling execution of the instruction on a per lane basis.

20. The computer system of claim 13, wherein if the type field specifies an arithmetic compare operation, the test field specifies a test selected from one or more of the following: signed greater than; unsigned higher than; signed less than or equal; unsigned lower than or same; and any other test suitable for combining with an arithmetic compare setting operation.

21. The computer system of claim 13, wherein if the type field specifies a floating point compare operation, the test field specifies a test selected from one or more of the following: equal; not equal; greater than or equal; greater than; less than or equal; less than; infinity of NaN; unordered; and any other test suitable for combining with a floating point compare setting operation.

22. The computer system of claim 13, wherein if the type field specifies a logical compare operation, the test field is selected from one or more of the following: equal; not equal; zero; not zero; bit clear; bit set; and any other test suitable for combining with a logical setting operation.

23. A computer program product embodied in a computer readable medium, that performs the method of claim 1.

24. A single instruction multiple data computer system, the computer system comprising:

a plurality of predication means each containing a plurality of flags for controlling per lane execution of operations; and a computer processor that executes an instruction, the instruction comprising at least one operand field specifying an operand store; an opcode specifying the operand lane size over which the setting operation is to be performed, indicating a type of operation to be used in a setting operation and indicating a test to be applied by the operation of the type indicated in the opcode field; and at least one destination field designating one of a plurality of predication means comprising flags to be set by the setting operation according to the setting instruction on a lane by lane basis;

wherein the computer processor executes the instruction and sets one or a predetermined plurality of flags in the designated predication means based on the size of the operand lane specified in the opcode field.

* * * * *